United States Patent Office 3,699,100
Patented Oct. 17, 1972

3,699,100
NOVEL 11β,18-EPOXY STEROIDS
Lucien Nedelec, Clichy-sous-Bois, and Jean-Claude Gasc, Bondy, France, assignors to Roussel-UCLAF, Paris, France
No Drawing. Filed Feb. 3, 1971, Ser. No. 112,386
Claims priority, application France, Feb. 11, 1970, 7004816
Int. Cl. C07c 173/00
U.S. Cl. 260—239.55 R    7 Claims

ABSTRACT OF THE DISCLOSURE

Novel 11β,18-epoxy-Δ$^{4,9}$-estradienes of the formula

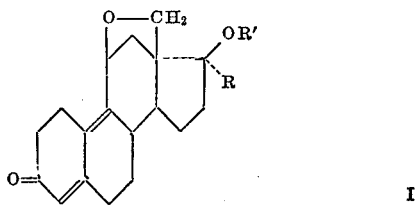

wherein R is selected from the group consisting of hydrogen and ethynyl and R' is selected from the group consisting of hydrogen, acyl of an organic carboxylic acid of 1 to 18 carbon atoms, lower aliphatic, arylaliphatic and heterocyclic which have anti-androgenic activity, their preparation and intermediates therefrom.

OBJECTS OF THE INVENTION

It is an object of the invention to provide the novel 11β,18-epoxy steroids of Formula I.

It is a further object of the invention to provide a novel process and novel intermediates for the preparation of 11β,18-epoxy steroids of Formula I.

It is another object of the invention to provide novel anti-androgenic compositions and to a novel method of inducing anti-androgenic activity in warm-blooded animals.

These and other objects and advantages of the invention will become obvious from the following detailed description.

THE INVENTION

The novel 11β,18-epoxy steroids of the invention have the formula

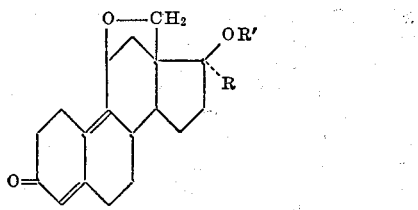

wherein R is selected from the group consisting of hydrogen and ethynyl and R' is selected from the group consisting of hydrogen, acyl of an organic carboxylic acid of 1 to 18 carbon atoms, lower aliphatic, arylaliphatic and heterocylic. Particularly preferred are 11β,18-epoxy-17α-ethynyl-Δ$^{4,9}$-estradiene-17β-ol-3-one and 11β,18-epoxy-17β-acetoxy-Δ$^{4,9}$-estradiene-3-one.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclo pentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-tertbutylfurane-2-carboxylic acid, 5-bromo-furane-2-carboxylic acid and nicotinic acids; β-ketoalkanoic acids, such as acetylacetic acid, propionylacetic acid and butyrylacetic acid.

Examples of suitable alcohols for forming the ethers of Formula I are lower aliphatic alcohols such as methanol, ethanol, propanol, isopropanol, the butanols, the pentanols, allyl alcohol, etc.; arylaliphatic alcohols, particularly phenyl lower alkanols such as benzyl alcohol and heterocyclic alcohols such as tetrahydropyranol.

The novel process for the preparation of the compound of Formula I wherein R' is hydrogen and R is ethynyl comprises reacting 3 - methoxy-Δ$^{1,3,5(10)}$-estratriene-11β, 17β-diol with acetic acid anhydride to selectively acetylate the 17 position, reacting the resulting 3-methoxy-17β-acetoxy-Δ$^{1,3,5(10)}$-estratriene-11β-ol with nitrous acid to form 3-methoxy - 11β - nitrosoxy - 17β - acetoxy-Δ$^{1,3,5(10)}$-estratriene, irradiating the latter in the presence of iodine to form 3-methoxy-17β-acetoxy-18-iodo-Δ$^{1,3,5(10)}$-estratriene-11β-ol, reacting the latter with a strong base to form 3 - methoxy - 11β,18 - epoxy - Δ$^{1,3,5(10)}$-estratriene-17β-ol, reducing the latter by the Birch reaction with lithium in liquid ammonia in the presence of an alcohol to form 3-methoxy-11β,18-epoxy-Δ$^{2,5(10)}$-estradiene-17β-ol, reacting the latter with a ketalization agent in an acid media to form the 3-ketal of 11β,18-epoxy-Δ$^{5(10)}$-estrene-17β-ol-3-one, oxidizing the latter by the Oppenauer reaction with aluminum lower alcoholate in the presence of a hydrogen acceptor to form the 3 ketal of 11β,18-epoxy-Δ$^{5(10)}$-estrene-3,17-dione, reacting the latter with an alkali metal acetylide and then hydrolyzing the product with a weak acid to obtain 11β,18-epoxy-17α-ethynyl-Δ$^{5(10)}$-estrene-17β-ol-3-one and reacting the latter with bromine in the presence of an organic tertiary base to form 11β,18-epoxy-17α-ethynyl-Δ$^{4,9}$-estradiene-17β-ol-3-one which may be esterified or etherified in the 17-position by classical methods.

The selective acetylation of the 17-position of 3-methoxy-Δ$^{1,3,5(10)}$-estratriene-11β,17β-diol is realized by reaction with acetic acid anhydride in a pyridine medium for 15 hours at 0° C. The nitroso derivative is preferably formed by reaction with an alkali metal nitrite in a mixture of acetic acid and acetic acid anhydride.

The photolysis of nitrous esters of steroids to introduce a bromine or iodine atom in the 18-position is described by Akhtar et al. [J.A.C.S., vol. 87 (1965), p. 4601]. The photolysis step is effected in the process of the invention in the presence of iodine while circulating a toluene solution of the nitrosoxy compound in a Pyrex glass serpentine under the light of a 250 watt Hanovia mercury vapor lamp while under an inert atmosphere. The raw mixture of the irradiation is preferably subjected to chromatography to recover 3-methoxy-17β-acetoxy-18-iodo-Δ$^{1,3,5(10)}$-estratriene-11β-ol.

The formation of the 11β-18-epoxy group is effected by reacting 3-methoxy-17β-acetoxy-18-iodo-Δ$^{1,3,5(10)}$-estratriene-11β-ol with a strong base such as an alkali metal methylate, ethylate or tert.-butylate, preferably in a mixture of lower alkanols, tetrahydrofuran and hexamethyl phosphortriamide. The reduction of the resulting product is preferably effected by the classical Birch method with lithium in liquid ammonia in the presence of an alcohol such as ethanol.

The formation of the 3-ketal is preferably effected by reacting 3-methoxy-11β,18-epoxy-$\Delta^{2,5(10)}$-estradiene-17β-ol with a 2,2-dialkyldioxolane in the presence of an acid such as sulfuric acid or p-toluene sulfonic acid and 2-methyl-2-ethyl-dioxolane is preferred.

With the 3-ketone group protected by the ketal group, 17β-ol group of 11β,18-epoxy-$\Delta^{5(10)}$-estrene-17β-ol-3-one can be oxidized by the Oppenauer method by reaction with an aluminum lower alcoholate or aluminum phenolate in the presence of a hydrogen acceptor such as lower ketones or aldehydes like cyclohexanone, benzoquinone, chloranil or anisaldehyde. The solvent is preferably an aromatic hydrocarbon like benzene, toluene or xylene.

The 17α-ethynyl substituent is introduced by reacting the 3-ketal of 11β,18-epoxy-$\Delta^{5(10)}$-estrene-3,17-dione with an alkali metal acetylide which can be formed by reacting acetylene with an alkali-metal alcoholate such as potassium tert.-amylate or tert.-butylate or with an alkali metal amide. The reaction is preferably effected in a ether such as isopropyl ether or tetrahydrofuran.

The hydrolysis of the 3-ketal group of 11β,18-epoxy-17α-ethynyl-$\Delta^{5(10)}$-estrene-17β-ol-3-one is preferably effected with a weak acid such as acetic acid or citric acid, most preferably in an aqueous medium in the presence of excess acid or a solvent such as methanol, ethanol or benzene or a mixture of said solvents. The formation of the 3-oxo-$\Delta^{4,9}$ system from 3-oxo-$\Delta^{5(10)}$ is effected with a dehydrogenation agent, preferably bromine in the presence of an organic tertiary base such as pyridine. The reaction is effected preferably in a lower alkanol such as methanol, ethanol or isopropanol.

The esterification of the 17β-ol group may be effected by reaction with an acylating derivative of the desired acid such as the acid chloride or acid anhydride preferably in the presence of a tertiary amine. The etherification of the 17β-ol group may be effected by reaction with a halide of the desired hydrocarbon on an alkali metal derivative of the 17β-ol.

The 11β,18-epoxy steriods of Formula I where R and R' are both hydrogen are prepared by reacting 3-methoxy-11β,18-epoxy-$\Delta^{2,5(10)}$-estradiene-17β-ol, prepared as discussed supra, with a weak acid to form 11β,18-epoxy-$\Delta^{5(10)}$-estrene-17β-ol-3-one and reacting the latter with bromine in the presence of an organic tertiary base to form 11β,18-epoxy-$\Delta^{4,9}$-estradiene-17β-ol-3-one which may be esterified or etherified by classical methods.

The weak acid to whose action the enol ether is subjected is preferably acetic acid and the reaction with bromine is preferably effected as discussed above.

In a variation of the process of the invention, 3-methoxy-11β-nitrosoxy-17β-acetoxy-$\Delta^{1,3,5(10)}$ - estratriene is subjected to photolysis to form 3-methoxy-17β-acetoxy-18-hydroxyimino-$\Delta^{1,3,5(10)}$-estratriene-11β-ol, reacting the latter with an acid agent to form 3-methoxy-11β,18-epoxy-$\Delta^{1,3,5(10)}$-estratriene-17β,18-diol, reacting the latter with a reducing agent to obtain 3-methoxy-$\Delta^{1,3,5(10)}$-estratriene-11β,17β,18-triol, reacting the latter with acid agent to obtain 3 - methoxy-11β,18-epoxy-$\Delta^{1,3,5(10)}$-estratriene-17β-ol which may be treated as in the above synthesis.

The photolysis is effected in a manner analogous to that of Akhtar et al. by circulating a toluene solution of the nitrous ester through a Pyrex glass serpentine while irradiating with a 250 w. Hanovia lamp. Preferably, a tertiary organic base such as triethylamine is present during the photolysis.

The acid agent used to change the 18-hydroxyimino compound into the corresponding 11β,18-epoxy compound is preferably a strong acid such as hydrochloric acid, sulfuric acid or p-toluene sulfonic acid. Preferably, hydrochloric acid in a mixture of acetone and acetic acid is used.

The reduction step is preferably effected with lithium aluminum hydride in an ether solvent such as isopropyl ether or tetrahydrofuran to form 3-methoxy-$\Delta^{1,3,5(10)}$-estratriene-11β,17β,18-triol. The acid treatment of the latter is preferably done with p-toluene sulfonic acid in an organic solvent such as benzene, toluene or xylene.

The novel anti-androgenic compositions of the invention are comprised of an effective amount of an 11β,18-epoxy steroid of Formula I and a major amount of a pharmaceutical carrier. The compositions may be in the form of injectable suspensions or solutions in ampoules or multiple dose flacons or in the form of tablets, coated tablets, sublingual tablets, capsules, suppositories, pommades, creams or lotions, prepared in the usual manner. The individual dose is 10 to 500 mg.

Because of their important anti-androgenic activity, the compositions of the invention are useful for the treatment of prostatic adenome, hyperandrogenia, acne or hirsutism. The compositions have the great advantage with respect to known anti-androgenic agents by manifesting a moderated progestomimetric activity and no antihypophysial activity.

The novel method of the invention of inducing anti-androgenic activity in warm-blooded animals comprises administering to warm-blooded animals an effective amount of an 11β,18-epoxy-steroid of Formula I. The said steroid may be administered orally, perlingually, transcutaneously, rectally or locally by topical application. The usual daily dose is 1 to 20 mg./kg. depending upon the method of administration.

In the following examples, there are described several preferred embodiments to illustrate the invention. However, it should be understood that the invention is not intended to be limited to the specific embodiments.

EXAMPLE I

Preparation of 11β,18-epoxy-17α-ethynyl-$\Delta^{4,9}$-estradiene-17β-ol-3-one

Step A: 3-methoxy-17β-acetoxy-$\Delta^{1,3,5(10)}$-estratriene-11β-ol.—23 g. of 3-methoxy-$\Delta^{1,3,5(10)}$-estratriene-11β,17β-diol [described by Stein et al., Tetra. Letters, 1967, p. 3603] were dissolved in 115 cc. of pyridine with stirring and after cooling the solution to —10° to —15° C., 23 cc. of acetic anhydride were added thereto. The reaction mixture was allowed to stand overnight at 0° C. and then excess acetic anhydride was destroyed by the addition of a few cc. of water without exceeding —10° C. The mixture was stirred for 15 minutes and then sufficient water was added to start crystallization and then 300 cc. of water were added. The mixture was vacuum filtered and the precipitate was washed with water and dried 1 hour in air. The precipitate was dissolved in 300 cc. of methylene chloride and the aqueous phase was decanted off. The organic phase was dried over magnesium sulfate and was passed through magnesium silicate and distilled to dryness. The residue was crystallized from isopropyl ether to obtain 14.37 g. (55% yield) of 3-methoxy-17β-acetoxy-$\Delta^{1,3,5(10)}$-estratriene-11β-ol. Concentration of the mother liquors gave another 5% yield of the product.

For analysis, the product was crystallized from isopropyl ether. The compound occurred in the form of colorless needles melting at 140° C. and having a specific rotation $[\alpha]_D^{20} = +110° \pm 2$ (c.=0.5% in chloroform). The product was soluble in alcohols, ether, acetone, benzene and chloroform and was insoluble in water.

Analysis.—$C_{21}H_{28}O_4$; molecular weight=344.43. Calculated: C, 73.22%; H, 8.19%. Found: C, 73.5%; H, 8.2%.

As far as is known, this compound is not described in the literature.

Step B: 3-methoxy-11β-nitrosoxy-17β-acetoxy-$\Delta^{1,3,5(10)}$-estratriene.—A mixture of 1 g. of 3-methoxy-17β-acetoxy-$\Delta^{1,3,5(10)}$-estratriene-11β-ol, 10 cc. of acetic acid, 2 cc. of acetic anhydride and 0.5 g. of sodium nitrite was stirred for 40 minutes at room temperature and was then added to a saturated aqueous sodium bicarbonate solution. The mixture was extracted with ether and the ether phases were washed with water, dried over sodium sulfate, filtered and distilled to dryness under reduced pressure to obtain 1.15 g. of 3-methoxy-11β-nitrosoxy-17β-acetoxy-Δ$^{1,3,5(10)}$-estratriene which was used as is for the next step. 0.97 g. of pure product were obtained by chromatography over silica gel and elution.

I.R. spectrum (chloroform): Presence of ONO complex at 1657 and 1644 cm.$^{-1}$.

U.V. spectrum (ethanol): Max. at 277–278 mμ, ε=2250; max. at 286 mμ, ε=2050.

As far as is known, this compound is not described in the literature.

Step C: 3-methoxy-17β-acetoxy-18-iodo-Δ$^{1,3,5(10)}$-estratriene-11β-ol.—A solution of 14 g. of 3-methoxy-11β-nitrosoxy-17β-acetoxy-Δ$^{1,3,5(10)}$-estratriene in 750 cc. of toluene containing 4.8 g. of iodine was irradiated with a 250 w. Hanovia lamp for 36 hours at room temperature while bubbling nitrogen therethrough and the thus irradiated solution was washed with sodium hyposulfite solution and then with water. The solution was distilled to dryness under reduced pressure and the residue of 15 g. was taken up in 40 cc. of a 9:1 mixture of benzene and ethyl acetate. The crystals were separated by vacuum filtration and the mother liquors were subjected to chromatography over silica H and elution with a 9:1 benzene-ethyl acetate mixture. The first-fraction had 3.8 g. of 3-methoxy-17β-acetoxy-18 - iodo-Δ$^{1,3,5(10)}$-estratriene-11β-ol and the crystalline residue was empasted with 10 cc. of boiling isopropyl ether to obtain 2.34 g. of the said product in the form of cream crystals melting at 205–210° C. The product was soluble in chloroform, slightly soluble in ethanol and insoluble in water and isopropyl ether.

Analysis.—$C_{21}H_{27}IO_4$; molecular weight=470.35. Calculated: I, 26.98%. Found: I, 26.9–27.1%.

RMN spectrum in deuterochloroform agreed with the said structure.

I.R. spectrum (chloroform): Presence of C=O at 1736 cm.$^{-1}$ (acetate function) and of OH at 3560 cm.$^{-1}$ and of a band corresponding to an ether of phenol.

As far as is known, this compound is not described in the literature.

Step D: 3-methoxy-11β,18-epoxy-Δ$^{1,3,5(10)}$-estratriene-17β-ol.—10.3 g. of 3-methoxy - 17β - acetoxy-18-iodo-Δ$^{1,3,5(10)}$-estratriene-11β-ol were suspended in a mixture of 103 cc. of methanol, 103 cc. of tetrahydrofuran and 20.6 cc. of hexamethyl phosphotriamide and after cooling the suspension to 10° C., 6.23 g. of sodium methylate were added thereto. The reaction mixture was stirred for 3 hours at room temperature under a nitrogen atmosphere and then 800 cc. of a water-ice mixture was added thereto with continued stirring. The mixture was vacuum filtered and the precipitate was washed with water and dried under reduced pressure to obtain 5.92 g. of 3-methoxy - 11β,18 - epoxy-Δ$^{1,3,5(10)}$-estratriene-17β-ol in the form of a colorless solid melting at 170° C. The product was soluble in chloroform.

I.R. spectrum (chloroform): Presence of OH at 3600 cm.$^{-1}$ and of aromatic at 1609, 1577 and 1497 cm.$^{-1}$.

As far as is known, this compound is not described in the literature.

Step E: 3-methoxy - 11β,18 - epoxy-Δ$^{2,5(10)}$-estradiene-17β-ol.—120 cc. of tetrahydrofuran and 4 cc. of ethanol were added to 120 cc. of ammonia cooled to −30° C. and 5.90 g. of 3-methoxy - 11β,18 - epoxy-Δ$^{1,3,5(10)}$-estratriene-17β-ol were dissolved in the mixture. After cooling to −50° C., 1.66 g. of lithium were added to the solution and the mixture was stirred for 40 minutes at this temperature. Excess lithium was destroyed by the addition of 30 cc. of ethanol at −50° C. and the ammonia was distilled off. The residue was added to 300 cc. of ice water and was then added to a mixture of ice-water and the mixture was allowed to stand for 30 minutes. The mixture was vacuum filtered and the precipitate was washed with water and dried under reduced pressure to obtain 5.40 g. of 3-methoxy-11β,18-epoxy-Δ$^{2,5(10)}$-estradiene-17β-ol in the form of a colorless solid melting at 177° C. after crystallization from a 9–1 mixture of isopropyl ether-methanol. The product was soluble in chloroform and ethanol and insoluble in water.

I.R. spectrum (chloroform): Presence of C=C at 1698 and 1666 cm.$^{-1}$.

As far as is known, this compound is not described in the literature.

Step F: 3-ethylenedioxy - 11β,18 - epoxy-Δ$^{5(10)}$-estrene-17β-ol.—A mixture of 5.4 g. of 3-methoxy-11β,18-epoxy-Δ$^{2,5(10)}$-estradiene-17β-ol, 108 cc. of methyl ethyl dioxolane, 2.12 cc. of glycol and 108 mg. of p-toluene sulfonic acid was stirred at room temperature for 15 hours and then the reaction mixture was neutralized by the addition of triethylamine. The mixture was added to water and extracted with methylene chloride. The combined organic phases were washed several times with water, were dried over sodium sulfate, was filtered and distilled to dryness under reduced pressure to obtain 7 g. of 3-ethylenedioxy-11β,18-epoxy-Δ$^{5(10)}$-estrene-17β-ol which was purified by chromatography over silica with elution with a 1:1 mixture of chloroform and acetone containing 0.2% of triethylamine to obtain a first crop of 3.85 g. of said product.

I.R. spectrum (chloroform): Presence of ketal; presence of OH at 3598 cm.$^{-1}$.

As far as is known, this compound is not described in the literature.

Step G: 3-ethylenedioxy-11β,18-epoxy-Δ$^{5(10)}$-estrene-17-one.—20 cc. of toluene were distilled off from a mixture of 3.8 g. of 3-ethylenedioxy-11β,-18-epoxy-Δ$^{5(10)}$-estrene-17β-ol, 133 cc. of toluene and 38 cc. of cyclohexanone and then a solution of 2.28 g. of aluminum isopropylate in 114 cc. of toluene were added thereto in 20 minutes while distilling to maintain a constant volume. The mixture was refluxed for 10 minutes and 100 cc. of an aqueous solution containing 18 g. of sodium and potassium tartrate were added thereto. The solvents were entrained with steam and the mixture was cooled and extracted with methylene chloride. The methylene chloride phase was washed with water, dried over sodium sulfate, was filtered and distilled to dryness under reduced pressure to obtain 3.8 g. of 3-ethylenedioxy-11β, 18-epoxy-Δ$^{5(10)}$-estrene-17-one which was used as is for the next step.

For analysis the product was purified by chromatography over silica, with elution with a 6:4 mixture of chloroform and acetone, and empasted in isopropyl ether. The product obtained was melted at 177° C.

I.R. spectrum (chloroform): Presence of C=O at 17 at 1725 cm.$^{-1}$; presence of ketal; absence of OH.

As far as is known, this compound is not described in the literature.

Step H: 3-ethylenedioxy - 11β,18 - epoxy-17α-ethylnyl-Δ$^{5(10)}$-estrene-17β-ol.—A solution of 4 g. of potassium tert.-butylate in 80 cc. of tetrahydrofuran was cooled to 5° C. and a current of acetylene was passed therethrough for 40 minutes. 3.8 g. of the product of step G in solution in 38 cc. of tetrahydrofuran were added thereto and the mixture was stirred for 40 minutes at room temperature. 100 cc. of iced aqueous sodium chloride solution were added and the mixture was extracted with methylene chloride. The organic phase was washed with water and was dried over sodium sulfate, was filtered and distilled to dryness under reduced pressure to obtain 3.72 g. of raw 17α-ethynyl product. The raw product was purified by chromatography over silica and elution with a 7–3 mixture of chloroform and acetone containing 0.2% triethylamine to obtain 2.76 g. of 3-ethylenedioxy-11β,18- epoxy-17α-ethynyl-Δ$^{5(10)}$-estrene-17β-ol melting at 242–244° C. 410 mg. of the product was empasted to obtain 345 mg. of the product in the form of cream crystals melting at 244° C. and soluble in chloroform and insoluble in water.

IR spectrum (chloroform): Presence of OH at 3580 cm.$^{-1}$ of —C≡CH at 3287 cm.$^{-1}$ and of ketal.

As far as is known, this compound is not described in the literature.

Step I: 11β,18-epoxy-17α-ethynyl - Δ$^{5(10)}$ - estrene-17β-ol-3-one.—3.18 g. of 3-ethylenedioxy-11β,18-epoxy-17α-ethynyl-Δ$^{5(10)}$-estrene-17β-ol dissolved in 96 cc. of acetic acid containing 25% water was stirred for six hours at room temperature and the reaction mixture was added to iced water. The mixture was vacuum filtered and the precipitate was washed with water and dried under reduced pressure in an oven to obtain 2.10 g. of 11β,18-epoxy-17α-ethynyl-Δ$^{5(10)}$-estrene-17β-ol-3-one in the form of cream crystals melting at 258° C.

I.R. spectrum (chloroform): Presence of OH at 3588 cm.$^{-1}$, of —C≡CH at 3300 cm.$^{-1}$ and of C=O at 1752, 1720 and 1710 cm.$^{-1}$.

As far as is known, this compound is not described in the literature.

Step J: 11β,18-epoxy-17α-ethynyl-Δ$^{4,9}$-estradiene-17β-ol-3-one.—A solution of 2.09 g. 11β,18-epoxy-17α-ethynyl-Δ$^{5(10)}$-estrene-17β-ol-3-one in 21 cc. of pyridine cooled to 0° C. was admixed with 3.47 cc. of a methanolic solution of 32.4 g. of bromine per liter and the mixture was stirred for 16 hours at room temperature. The mixture was poured into water, vacuum filtered and the precipitate was washed with water to obtain 1.39 g. of 11β,18-epoxy-17α-ethynyl-Δ$^{4,9}$-estradiene-17β-ol-3-one melting at 280° C.

For analysis, the product was crystallized from a 1:1 pyridine-methanol mixture to obtain cream crystals melting at 280.5° C. and having a specific rotation $[\alpha]_D^{20}$= —149° C.±2 (c.=1% in pyridine). The product was insoluble in water and in most of the usual organic solvents.

Analysis.—$C_{20}H_{22}O_3$; molecular weight=310.38. Calculated (percent): C, 77.38; H, 7.14. Found (percent): C, 77.2; H, 7.0.

I.R. spectrum (Nujol): Presence of OH and ≡CH at 3295 and 3257 cm.$^{-1}$, presence of —C≡CH at 2175 cm.$^{-1}$ and of conjugated carbonyl of the dienone type at 1660, 1583 and 1559 cm.$^{-1}$.

As far as is known, this compound is not described in the literature.

EXAMPLE II

Preparation of 11β,18-epoxy-17β-acetoxy-Δ$^{4,9}$-estradiene-3-one

Step A: 11β,18-epoxy-Δ$^{5(10)}$-estrene-17β-ol-3-one.—730 mg. of 3-methoxy-11β,18-epoxy-Δ$^{2,5(10)}$-estradiene-17β-ol dissolved in 11 cc. of acetic acid containing 25% water was stirred for 2½ hours at room temperature and the reaction mixture was poured into ice water. The mixture was extracted with methylene chloride and the organic phases were washed with a saturated aqueous sodium bicarbonate solution, then water, dried over sodium sulfate, filtered and distilled to dryness under reduced pressure. The residue was empasted with 5 cc. of ether and was iced. The mixture was vacuum filtered and the precipitate was dried to obtain 518 mg. of 11β,18-epoxy-Δ$^{5(10)}$-estrene-17β-ol-3-one in the form of a colorless solid melting at 116° C. The product was soluble in chloroform and insoluble in water.

I.R. spectrum (chloroform): Presence of OH at 3600 cm.$^{-1}$, of ketone at 1710–1713 cm.$^{-1}$ and of cyclic C—O—C.

As far as is known, this compound is not described in the literature.

Step B: 11β,18-epoxy-Δ$^{4,9}$-estradiene-17β-ol-3-one.—1.6 cc. of a methanolic solution of bromine titrating 19 g. per 100 cc. were added to a solution of 518 mg. of 11β,18-epoxy-Δ$^{5(10)}$-estrene-17β-ol-3-one in 5.18 cc. of pyridine cooled to 0° C. and the mixture was stirred for 16 hours at room temperature. 10 cc. of ice water were added thereto and the mixture was extracted with methylene chloride. The organic extracts were washed with N hydrochloric acid, then with water and was dried over sodium sulfate, filtered and distilled to dryness under reduced pressure. 100 mg. of the residue were dissolved in a boiling 9:1 isopropyl ether-ethyl acetate mixture and the solution was iced and vacuum filtered. The precipitate was dried to obtain 70 mg. of 11β,18-epoxy-Δ$^{4,9}$-estradiene-17β-ol-3-one in the form of cream crystals melting at 174° C. The crystals were soluble in ethanol and chloroform and insoluble in water.

I.R. spectrum (chloroform): Presence of dienone at 1661, 1626 and 1590 cm.$^{-1}$ and of OH at 3600 cm.$^{-1}$.

U.V. spectrum (ethanol):

Influx towards 227 mμ $E_{1cm.}^{1\%}$ =163

Max. at 294–295 mμ $E_{1cm.}^{1\%}$=589 ε=16,850

As far as is known, this compound is not described in the literature.

Step C: 11β,18-epoxy-17β-acetoxy-Δ$^{4,9}$ 1 estradiene - 3-one.—A mixture of 498 mg. of 11β,18-epoxy-Δ$^{4,9}$-estradiene-17β-ol-3-one, 3 cc. of pyridine and 1.5 cc. of acetic acid anhydride was stirred at room temperature for 2½ hours and then was added to 15 cc. of ice water. The mixture was extracted with methylene chloride and the organic phase was washed with N hydrochloric acid, then with water. The said phase was then dried over sodium sulfate, was filtered and distilled to dryness under reduced pressure. The residue was purified by chromatography over silica and elution with a 9:1 mixture of chloroform and acetone. The product was crystallized from hot and cold isopropyl ether to obtain 252 mg. of 11β,18-epoxy-17β-acetoxy-Δ$^{4,9}$-estradiene-3-one in the form of colorless crystals melting at 116.5° C. and having a specific rotation $[\alpha]_D^{20}$= —123°±3

(c.=0.6% in ethanol). The product was soluble in ethanol and chloroform and insoluble in water.

Analysis.—$C_{20}H_{24}O_4$; molecular weight=328.39. Calculated: C, 73.14%; H, 7.37%. Found: C, 73.2%; H, 7.3%.

I.R. spectrum (chloroform): Absence of OH and presence of —C=O dienone at 1661 cm.$^{-1}$, of —C=C at 1629 and 1592 cm.$^{-1}$ and of —C=O (acetate) at 1738 cm.$^{-1}$.

U.V. spectrum (ethanol):

Max. at 213–214 mμ $E_{1cm.}^{1\%}$=192

Inflex towards 231–232 mμ $E_{1cm.}^{1\%}$=149 ε=21,700

Max. at 295 mμ $E_{1cm.}^{1\%}$=660

As far as is known, this compound is not described in the literature.

EXAMPLE III

Preparation of 3-methoxy-11β,18-epoxy-Δ$^{1,3,5(10)}$-estratriene-17β-ol

Step A: 3-methoxy-18-hydroxyimino - 17β - acetoxy-Δ$^{1,3,5(10)}$-estradiene-11β-ol.—A solution of 3.3 g. of 3-methoxy-11β-nitrosoxy-17β-acetoxy-Δ$^{1,3,5(10)}$ - estratriene in 200 cc. of toluene containing 0.25% of triethylamine was irradiated with a 250 watt Hanovia lamp for 2¼ hours at room temperature and then the solvent was distilled off to obtain 3.8 g. of raw product. The said product was purified by chromatography over silica and elution with a 9:1 mixture of chloroform and acetone which after evaporation gave 425 mg. of 3-methoxy-18-hydroxyimino-17β-acetoxy-Δ$^{1,3,5(10)}$-estratiene-11β-ol melting at 180–183° C. The cream solid was soluble in chloroform and methanol, slightly soluble in isopropylether and insoluble in water.

I.R. spectrum (chloroform): Presence of $CH_3COO$ at 1725 cm.$^{-1}$ and of strong OH bands. The RMN spectrum confirmed the structure.

As far as is known, this compound is not described in the literature.

Step B: 3-methoxy-11β,18-epoxy-$\Delta^{1,3,5(10)}$-estratriene-17β,18-diol.—A mixture of 730 mg. of 3-methoxy-18-hydroxyimino-17β-acetoxy-$\Delta^{1,3,5(10)}$-estratriene-11β - ol, 7.3 cc. of 2 N hydrochloric acid, 7.3 cc. of acetone and 3.65 cc. of acetic acid was stirred for 22 hours at room temperature and the reaction mixture was added to ice water and stirred for 1 hour. The mixture was vacuum filtered and the precipitate was washed with water and dried under reduced pressure to obtain 455 mg. of 3-methoxy-11β,18-epoxy-$\Delta^{1,3,5(10)}$-estratriene-17β-18 - diol melting at 207–210° C. The cream crystals were soluble in pyridine, slightly soluble in chloroform and insoluble in water.

I.R. spectrum (chloroform): Absence of acetate and presence of OH at 3573 and 3470 cm.$^{-1}$.

As far as is known, this compound is not described in the literature.

Step C: 3-methoxy-$\Delta^{1,3,5(10)}$ - estratriene - 11β,17β,18-triol.—A mixture of 440 mg. of 3-methoxy-11β,18-epoxy-$\Delta^{1,3,5(10)}$-estratriene-17β,18-diol, 22 cc. of tetrahydrofuran and 880 mg. of lithium aluminum hydride was refluxed for 30 hours and then excess hydride was destroyed by the addition of tetrahydrofuran containing 10% water. The mixture was filtered and the filtrate was evaporated to dryness. The residue was subjected to chromatography on silica and elution wih a 1:1 mixture of choroform-acetone to obtain 280 mg. of 3-methoxy-$\Delta^{1,3,5(10)}$-estratriene-11β,17β,18-triol melting at 162° C. and then 171° C. The colorless solid was slightly soluble in the usual organic solvents and insoluble in water.

I.R. spectrum (Nujol): Presence of OH at 3175 cm.$^{-1}$ and of aromatic at 1604, 1572 and 1498 cm.$^{-1}$.

As far as is known, this compound is not described in the literature.

Step D: 3-methoxy-11β,18-epoxy-$\Delta^{1,3,5(10)}$-estratriene-17β-ol.—20 mg. of p-toluene sulfonic acid were added to a suspension of 100 mg. of 3-methoxy-$\Delta^{1,3,5(10)}$-estratriene-11β-17β,18-triol in 10 cc. of benzene and the mixture was refluxed for 7 hours. After cooling, the reaction mixture was neutralized with triethylamine addition and was added to water. The mixture was extracted three times with benzene and the combined benzene phases where washed with water, dried over sodium sulfate, filtered and evaporated to dryness under reduced pressure to obtain 0.100 g. of raw product. The latter was purified by chromatography on silica gel and elution with an 8:2 mixture of chloroform-acetone to obtain 30 mg. of 3-methoxy-11β,18-epoxy-$\Delta^{1,3,5(10)}$-estratriene-17β-ol melting at 170° C. The colorless solid was soluble in chloroform and insoluble in water.

I.R. spectrum (chloroform): Presence of OH at 3600 cm.$^{-1}$ and of aromatic at 1609, 1577 and 1497 cm.$^{-1}$.

As far as is known, this compound is not described in the literature.

The synthesis was continued as in steps E to J of Example I to obtain 11β,18-epoxy-17α-ethynyl-$\Delta^{4,9}$-estradiene-17β-ol-3-one.

PHARMACOLOGICAL STUDY (A) Exogenic anti-androgenic activity

The exogenic anti-androgenic activity was determined against testosterone propionate in castrated male rats in the Lerner method described by Dorfman in Methods in Hormone Research, vol. II, p. 320. Young male rats about 4 weeks old were castrated and treatment was started the day after the castration and was continued for 7 days. On the eighth day, the animals were killed and the relevant organs, namely prostate, seminal vesicules and levator ani, were recovered. 11β,18-epoxy-17α-ethynyl-$\Delta^{4,9}$-estradiene-17β-ol-3-one and testosterone propionate were used in sesame oil containing 5% benzylic alcohol and they were administered separately subcutaneously, the epoxy compound being administered at 1 mg. per rat and per day and testosterone propionate at 50γ per rat and per day. One group of rats serving as the control received only the solvent, one group received 50γ of testosterone propionate, one group received 1 mg. of the test compound and 1 group received 1 mg. of the test product and 50γ of testosterane propionate. The results were reported in Table I.

TABLE I

| Group | Daily dose | Fresh Lavator ani in mg. | Seminal vesicules in mg. | Prostate in mg. |
| --- | --- | --- | --- | --- |
| Controls | 0 | 24.90 | 7.6 | 11.8 |
| Testosterone propionate | 50γ | 42.50 | 94.2 | 109.7 |
| Test product | 1 mg | 24.90 | 7.6 | 16.7 |
| Test product plus testosterone propionate. | 1 mg. plus 50γ | 29.90(−29%) | 30.3(−64%) | 55.4(−50%) |

In a second test, the test product was administered under the same conditions at a dose of 0.4 mg. and the results are reported in Table II.

TABLE II

| Group | Daily dose | Fresh Lavator ani in mg. | Seminal vesicules in mg. | Prostate in mg. |
| --- | --- | --- | --- | --- |
| Controls | 0 | 17.0 | 5.2 | 8.5 |
| Testosterone propionate | 50γ | 56.50 | 54.8 | 108.2 |
| Test Compound | 0.4 mg | 14.00 | 17.6 | 13.9 |
| Test Compound plus testosterone propionate. | 0.4 mg. plus 50γ | 22.20(−61%) | 47.4(−15%) | 65.7(−39%) |

The results show that the compound of the invention exercises a clear anti-androgenic activity at a dose of 0.4 mg. against a dose of 50γ of testosterone propionate.

Various modifications of the compositions and method of the invention may be made without departing from the spirit or scope thereof and it is to be understood that the invention is intended to be limited only as defined in the appended claims.

We claim:

1. An 11β,18-epoxy-$\Delta^{4,9}$-estradiene of the formula

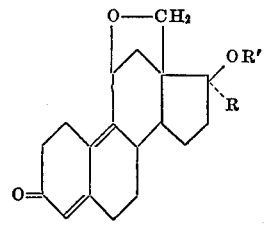

I wherein R is selected from the group consisting of hydrogen and ethynyl and R' is selected from the group consisting of hydrogen, acyl of an organic carboxylic acid of 1 to 18 carbon atoms, lower alkyl and alkenyl, phenyl lower alkyl and tetrahydropyranyl.

2. A compound of claim 1 which is 11β,18-epoxy-17α-ethynyl-Δ⁴,⁹-estradiene-17β-ol-3-one.

3. A compound of claim 1 which is 11β,18-epoxy-17β-acetoxy-Δ⁴,⁹-estradiene-3-one.

4. A compound of claim 1 which is 11β,18-epoxy-Δ⁴,⁹-estradiene-17β-ol-3-one.

5. A process for the preparation of the compound of claim 2 comprising reacting 3-methoxy-Δ$^{1,3,5(10)}$-estratriene-11β,17β-diol with acetic acid anhydride to selectively acetylate the 17-position, reacting the resulting 3-methoxy-17β-acetoxy-Δ$^{1,3,5(10)}$-estratriene-11β-ol with nitrous acid to form 3-methoxy-11β-nitrosoxy-17β-acetoxy-Δ$^{1,3,5(10)}$-estratriene, irradiating the latter in the presence of iodine to form 3-methoxy-17β-acetoxy-iodo-Δ$^{1,3,5(10)}$-estratriene-11β-ol, reacting the latter with a strong base to form 3 - methoxy - 11β,18 - epoxy-Δ$^{1,3,5(10)}$-estratriene-17β-ol, reacting the latter with lithium in liquid ammonia in the persence of an alcohol to form 3-methoxy-11β,18-epoxy-Δ$^{2,5(10)}$-estradiene-17β-ol, reacting the latter with a ketalization agent in an acid media to form the 3-ketal of 11β,18-epoxy-Δ$^{5(10)}$-estrene-17β-ol-3-one, oxidizing the latter by the Oppenauer reaction with alumimum lower alcoholate in the presence of a hydrogen acceptor to form the 3-ketal of 11β,18-epoxy-Δ$^{5(10)}$-estrene-3,17-dione, reacting the latter with an alkali metal acetylide and then hydrolyzing the product with a weak acid to obtain 11β,18-epoxy-17α-ethynyl-Δ$^{5(10)}$-estrene-17β-ol-3-one and reacting the latter with bromine in the presence of an organic tertiary base to form 11β,18-epoxy-17α-ethynyl-Δ⁴,⁹-estradiene-17β-ol-3-one.

6. A process for the preparation of the compound of claim 4 comprising reacting 3-methoxy-Δ$^{1,3,5(10)}$-estradiene-11β,17β-diol with acetic acid anhydride to selectively acetylate the 17 position, reacting the resulting 3-methoxy-17β-acetoxy-Δ$^{1,3,5(10)}$-estratriene-11β-ol with nitrous acid to form 3-methoxy-11β-nitrosoxy-17β-acetoxy-Δ$^{1,3,5(10)}$-estratriene, irradiating the latter in the presence of iodine to form 3-methoxy - 17β - acetoxy - 18 - iodo-Δ$^{1,3,5(10)}$-estratriene-11β-ol, reacting the latter with a strong base to form 3-methoxy - 11β,18 - epoxy-Δ$^{1,3,5(10)}$-estratriene-17β-ol, reacting the latter with lithium in liquid ammonia in the presence of an alcohol to form 3-methoxy-11β,18-epoxy-Δ$^{2,5(10)}$-estradiene-17β-ol, reacting the latter with a weak acid to form 11β,18-epoxy-Δ$^{5(10)}$-estrene-17β-ol-3-one and reacting the latter with bromine in the presence of an organic tertiary base to form 11β,18-epoxy-Δ⁴,⁹-estradiene-17β-ol-3-one.

7. A process for the preparation of 3-methoxy-11β,18-epoxy-Δ$^{1,3,5(10)}$-estratriene-17β-ol comprising subjecting 3-methoxy-11β-nitrosoxy-17β-acetoxy-Δ$^{1,3,5(10)}$-estratriene to photolysis to form 3-methoxy - 17β - acetoxy-18-hydroxyimino-Δ$^{1,3,5(10)}$-estratriene-11β-ol, reacting the latter with an acid agent to form 3-methoxy-11β,18-epoxy-Δ$^{1,3,5(10)}$-estratriene-17β,18-diol, reacting the latter with a reducing agent to obtain 3-methoxy-Δ$^{1,3,5(10)}$-estratriene-11β,17β,18-triol, reacting the latter with acid agent to obtain 3-methoxy-11β,18-epoxy-Δ$^{1,3,5(10)}$-estratriene-17β-ol.

References Cited
UNITED STATES PATENTS
3,423,404  1/1969  Klimstra _____ 260—239.55

HENRY A. FRENCH, Primary Examiner

U.S. Cl. X.R.

204—158; 260—239.55 C, 397, 5; 424—241